(12) United States Patent
Talanki et al.

(10) Patent No.: US 12,223,188 B2
(45) Date of Patent: Feb. 11, 2025

(54) MEMORY INTERFACE FOR INITALIZING MEMORY AND METHOD THEREOF

(71) Applicant: SAMSUNG ELECTRONICS CO., LTD., Suwon-si (KR)

(72) Inventors: Raghu Vamsi Krishna Talanki, Bangalore (IN); Archita Khare, Bangalore (IN); Rahul Tarikere Ravikumar, Bangalore (IN); Jinin So, Hwaseong-si (KR); Jonggeon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/748,564

(22) Filed: May 19, 2022

(65) Prior Publication Data

US 2023/0214138 A1    Jul. 6, 2023

(30) Foreign Application Priority Data

Jan. 6, 2022    (IN) .............................. 202241000690

(51) Int. Cl.
*G06F 3/06*    (2006.01)
*G06F 12/1027*    (2016.01)

(52) U.S. Cl.
CPC .......... *G06F 3/0632* (2013.01); *G06F 3/0604* (2013.01); *G06F 3/0659* (2013.01); *G06F 3/0673* (2013.01); *G06F 12/1027* (2013.01)

(58) Field of Classification Search
CPC .... G06F 3/0604; G06F 3/0632; G06F 3/0659; G06F 3/0673; G06F 12/1027
See application file for complete search history.

(56) References Cited

U.S. PATENT DOCUMENTS

| | | | |
|---|---|---|---|
| 5,539,895 A * | 7/1996 | Bishop | G06F 12/08 711/119 |
| 6,137,734 A * | 10/2000 | Schoner | G11C 29/50012 365/194 |
| 8,307,259 B2 | 11/2012 | Wheeler et al. | |
| 9,710,176 B1 | 7/2017 | Tang et al. | |
| 9,715,939 B2 | 7/2017 | Ellis et al. | |
| 9,971,733 B1 * | 5/2018 | Teh | G06F 15/7803 |
| 2002/0087816 A1 * | 7/2002 | Atkinson | G06F 12/08 711/158 |
| 2003/0097608 A1 | 5/2003 | Rodeheffer et al. | |
| 2008/0022032 A1 * | 1/2008 | Nicholas | G06F 9/4418 711/100 |
| 2012/0047337 A1 * | 2/2012 | Grusy | G06F 3/0604 711/E12.002 |
| 2013/0290760 A1 | 10/2013 | Cooper et al. | |
| 2018/0165100 A1 | 6/2018 | Natu et al. | |
| 2022/0151207 A1 * | 5/2022 | Mott | A01K 11/008 |

* cited by examiner

*Primary Examiner* — Larry T Mackall
(74) *Attorney, Agent, or Firm* — F. Chau & Associates, LLC

(57) ABSTRACT

A memory interface for interfacing with a memory device includes a control circuit configured to determine whether a trigger event has occurred for initializing one or more memory locations in the memory device, and initialize the one or more memory locations in the memory device with pre-defined data upon determining the trigger event has occurred.

19 Claims, 7 Drawing Sheets

MEMORY INTERFACE FOR INITALIZING MEMORY AND METHOD THEREOF

CROSS-REFERENCE TO RELATED APPLICATIONS

This non-provisional U.S. patent application claims priority under 35 U.S.C. § 119 to Indian Patent Application No. 202241000690 filed on Jan. 6, 2022 in the Indian Intellectual Property Office, the disclosure of which is incorporated by reference in its entirety herein.

TECHNICAL FIELD

The present disclosure generally relates to memory initialization.

DISCUSSION OF RELATED ART

Volatile memory is computer memory of a computer system that needs power to maintain stored information. Volatile memory retains its contents while powered on but when power is interrupted, the stored data is quickly lost. Accordingly, volatile memory such as dynamic random-access memory (DRAM), needs to be initialized after being powered on. Non-volatile memory is a type of computer memory that can retain stored information even after power is removed. Application programs and data used by the programs may be stored in regions of the volatile memory or non-volatile memory. However, since these programs may share a same region, memory locations of the shared region may need to be initialized before a next one of the programs is started.

Memory initialization may include setting each address of the memory corresponding to one or more variables to an initial value. The variables may be located with an application program. For example, the application program may be installed with default or user-specified values that are used by the application program during execution. Initially, memory allocation is performed during memory initialization. Memory allocation is a process by which the application program is assigned with physical or virtual memory space.

The computer system may use a central processing unit (CPU), a cache, and a translation lookaside buffer (TLB) to perform the memory initialization. However, cache pollution and TLB pollution may reduce efficiency of the computing system. Cache pollution describes situations where a computer program loads data into the cache unnecessarily. Thus, useful data is evicted from the cache into lower levels of memory hierarchy. This results in significant loss in time and increases consumption of resources. TLB pollution occurs due to TLB misses. TLB misses are caused when required data cannot be pre-fetched from the TLB. This results in further loss in time and increases consumption of resources. Also, usage of the CPU and a data bus of the computer system during the memory initialization may be high. Further, power consumption of the computer system also increases when the usage of the CPU increases.

SUMMARY

According to an exemplary embodiment of the inventive concept, a memory interface for interfacing with a memory device is provided. The memory interface includes a control circuit configured to determine whether a trigger event has occurred for initializing one or more memory locations in the memory device, and initialize the one or more memory locations in the memory device with pre-defined data upon determining the trigger event has occurred.

According to an exemplary embodiment of the inventive concept, a method for interfacing with a memory device is provided. The method includes: determining, by a control circuit of a memory interface, whether a trigger event has occurred for initializing one or more memory locations in the memory device; and initializing, by the control circuit, the one or more memory locations in the memory device with pre-defined data related upon determining the trigger event has occurred.

According to an exemplary embodiment of the inventive concept, a memory interface for interfacing with a memory device is provided. The memory interface includes: a memory controller, a cache, and a CPU. The memory controller is connected to the memory device. The cache is connected to the memory controller. The CPU is connected to the cache via a data bus and connected to the memory controller via signal line separate from the data bus. The memory controller initializes one or more memory locations of the memory device in response to receiving a trigger signal from the CPU via the signal line.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
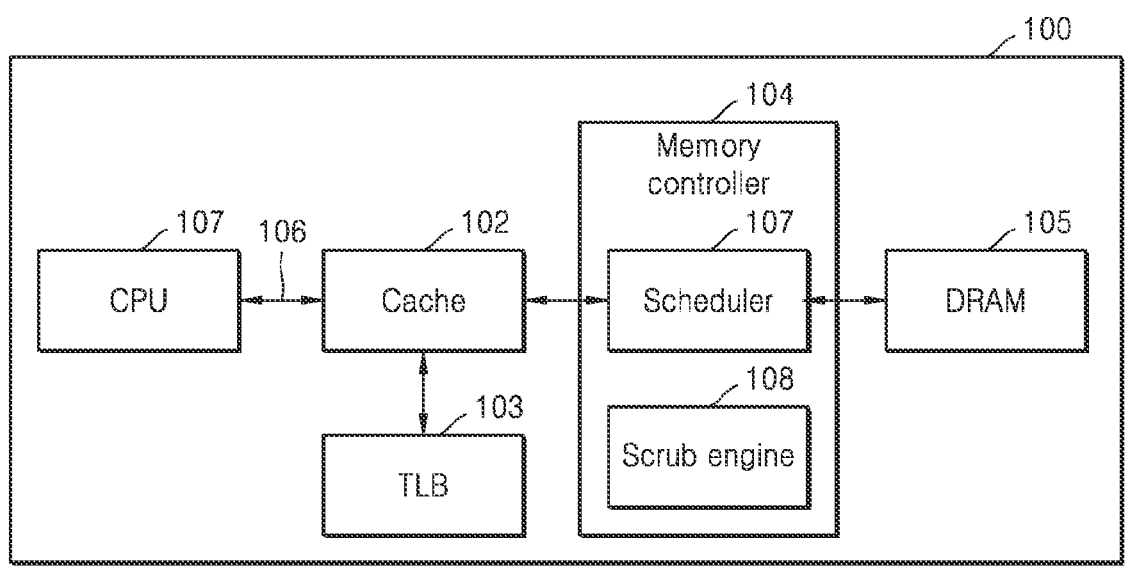
FIG. 1 shows a computer system for performing memory initialization.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

At least one embodiment of the present disclosure relates to a scrub engine of a memory controller in a computer system. The scrub engine is used to perform memory scrubbing in the computer system. In an embodiment of the present disclosure, a write controller of the scrub engine is configured to perform initialization of memory locations in memory of the computer system. As an example, the memory is volatile memory such as dynamic random-access memory (DRAM). The write controller determines a trigger for performing the initialization. Further, the write controller initialises the memory locations with pre-defined data. At least one embodiment of the present disclosure does not require a cache or a translation lookaside buffer (TLB), to perform the memory initialization. Thus, cache and TLB pollution can be avoided. Further, a data bus is not required to perform the memory initialization in at least one embodiment of the disclosure. Accordingly, usage of a central processing unit (CPU) in the computer system may be reduced, which also reduces power consumption of the computer system.

FIG. 1 shows a computer system 100 according to a comparative example for performing memory initialization. The computer system 100 includes a Central processing unit (CPU) 101, a cache 102, a Translation Lookaside Buffer (TLB) 103, a memory controller 104, and a Dynamic Random-Access Memory (DRAM) 105. The memory controller 104 includes a scheduler 107 and a scrub engine 108. The computer system 100 may include other components. Initially, the computer system 100 may perform memory allocation. The CPU 101 receives data for performing the memory initialization from memory units associated with the computer system 100. Further, the CPU 101 updates the cache 102 with the data. The TLB 103 is used to reduce the time taken to access memory locations of the DRAM 105. The cache 102 communicates the data to the scheduler 107 of the memory controller 104. The scheduler 107 is used to control operations performed on the DRAM 105. The data is updated to the DRAM 105, to complete processing of the memory initialization. The scrub engine 108 of the memory controller 104 is used to perform memory scrubbing of the memory units.

Figure 2:
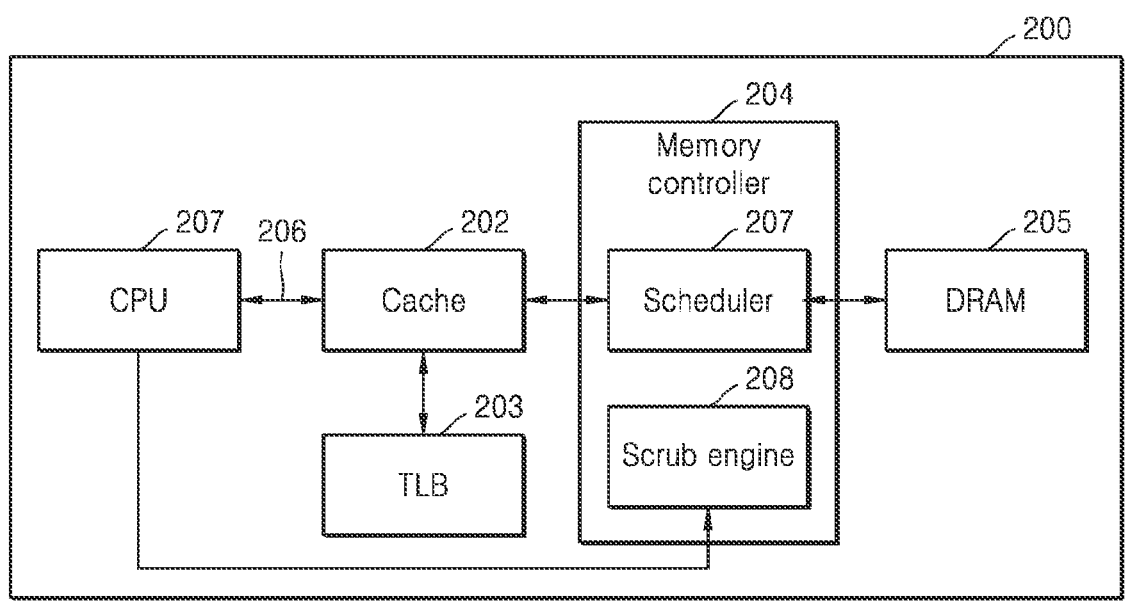
FIG. 2 illustrates a block diagram of a computer system for initialising one or more main memory locations in volatile memory, in accordance with an embodiment of the present disclosure.

FIG. 2 illustrates a block diagram of a computer system 200 for initialising one or more main memory locations in DRAM, in accordance with an embodiment of the present disclosure. The computer system 200 includes a CPU 201, a cache 202, a TLB 203, a memory controller 204 (e.g., a control circuit) and a volatile memory (e.g., DRAM 205). The memory controller 204 may include a scheduler 207 and a scrub engine 208. The scheduler 207 and the scrub engine 208 may each be implemented by respective logic circuits or by a computer program executed by a processor within the memory controller 204. While the memory of the computer system 200 is discussed herein as a volatile memory for ease of discussion, the inventive concept is not limited thereto. For example, the memory could be replaced with a non-volatile such as NAND flash memory.

In an embodiment, a memory interface (e.g., a controller-DRAM interface) for interfacing with the memory includes the memory controller 204. In an embodiment, the memory interface includes the CPU 201 in addition to the memory controller 206. In an embodiment, the memory interface includes the cache 202 and the TLB 203 in addition to the memory controller 206 and the CPU 201. In an embodiment, the CPU 201 is located in a host interface circuit of a host device that communicates with the memory interface.

The computer system 200 may include components other than those represented in FIG. 2. The CPU 201 may include at least one data processor for executing program components (e.g., functions, procedures, routines, instructions) for executing user or system-generated requests. The cache 202 is a supplementary memory system associated with the computer system 200. The cache 202 temporarily stores frequently used instructions and data for quicker processing by the CPU 201. The TLB 203 includes a fixed number of entries for mapping virtual addresses to physical addresses of one or more memory locations of the computer system 200.

The TLB 203 is used to reduce time taken to access the one or more memory locations. The memory controller 204 manages read and write operations to a plurality of memory units associated with the computer system 200. The components of the memory controller 204 for performing the memory initialization of the DRAM 205 is represented in FIG. 2. However, the memory controller 204 may include components other than those represented in FIG. 2.

The scheduler 207 manages multiple memory requests received from one or more applications in the computer system 200. The memory requests may include, but are not limited to, memory allocation, memory initialization, memory de-allocation, and the like. The scrub engine 208 is used to perform memory scrubbing in the computer system 200. The memory scrubbing refers to correction of errors in data associated with the plurality of memory units of the computer system 200. The errors may be due to cosmic rays, alpha particle emission, and the like. The plurality of memory units may be the DRAM 205, Static Random-Access Memory (SRAM), and the like. The scrub engine 208 is configured to read initial data in each of the plurality of memory units of the computer system 200. Further, the scrub engine 208 is configured to correct errors in the initial data to generate corrected data. Furthermore, the scrub engine 208 is configured to write the corrected data to a corresponding memory unit from the plurality of memory units.

Figure 3A:
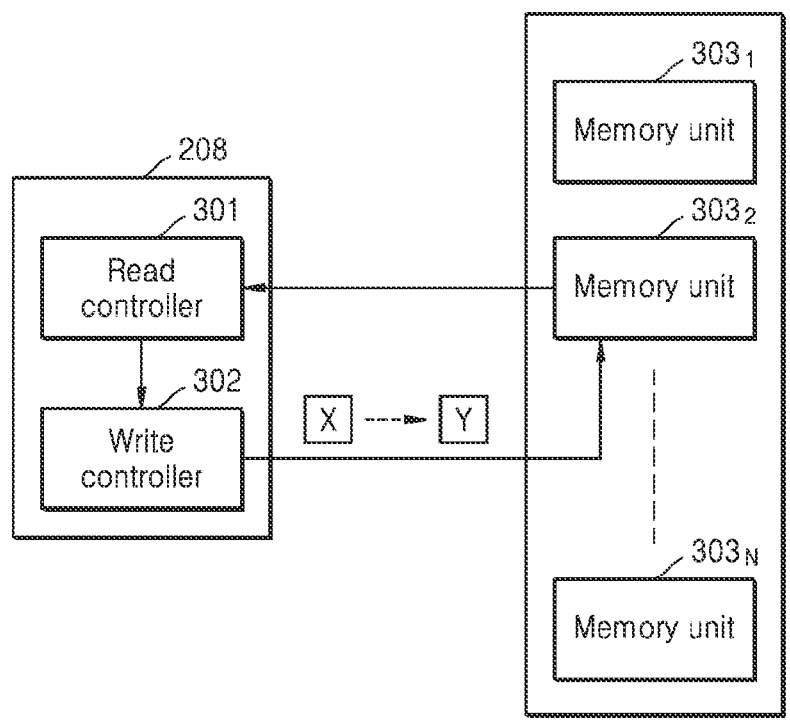
FIG. 3A illustrates block diagram of a scrub engine for performing memory scrubbing in a computer system, in accordance with an embodiment of the present disclosure.

FIG. 3A illustrates a block diagram of the scrub engine 208 for performing the memory scrubbing in the computer system 200. The scrub engine 208 includes a read controller 301 (e.g., a control circuit) and a write controller 302 (e.g., a control circuit). The read controller 301 may be configured to read the initial data in each of a plurality of memory units $303_1, 303_2 \ldots 303_N$ (e.g., memory devices, memory chips, etc.). The plurality of memory units $303_1, 303_2 \ldots 303_N$ are referred as the plurality of memory units 303 hereafter in the present description. Further, the read controller 301 may be configured to correct errors in the initial data. In an embodiment, the errors may be corrected using an Error-Correcting Code (ECC). For example, the ECC may be Automatic Repeat Request (ARQ), Forward Error Correction, Cyclic Redundancy Check (CRC), and the like. The write controller 302 may receive new data from the read controller 301 upon detection of the error. The new data is a corrected form of the initial data. Further, the write controller 302 may be configured to write the new data to each of the plurality of memory units 303 of the computer system 200. Referring to FIG. 3A, the read controller 301 may read the initial data as a value X in a memory unit $303_2$. For example, the value X may be "1". The read controller 301 may determine that the initial data includes an error. The error may be a bit error. The new data may be a value Y. For example, the value Y may be "0". The write controller 302 receives the value Y as "0" from the read controller 301. The write controller 302 may write the value Y in the memory unit $303_2$. For example, if the initial data corresponds to a variable of an application stored at a first address, the write controller 301 could write the new data to the first address or write the new data to a second address and update memory mapping information to indicate the variable is stored at the second address.

In an embodiment of the present disclosure, the write controller 302 is configured to perform the memory initialization on the DRAM 205. In an embodiment, the DRAM 205 is a main memory of the computer system 200. The DRAM 205 may include the one or more main memory locations.

Figure 3B:
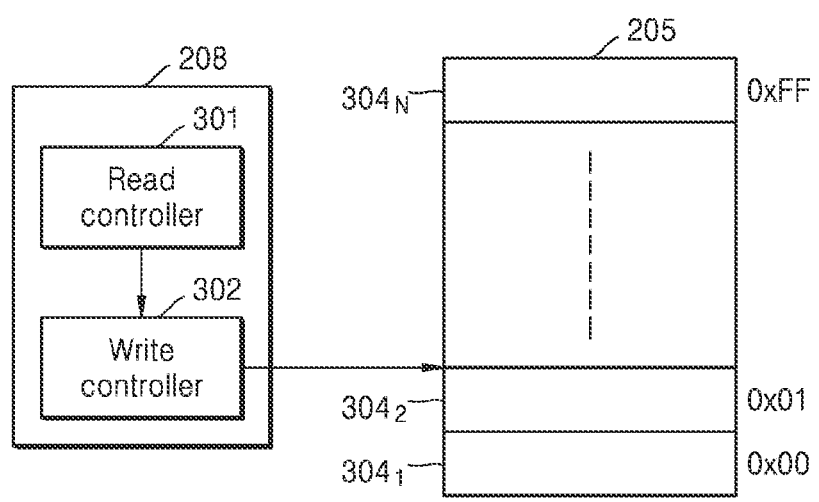
FIG. 3B illustrates block diagram of a scrub engine for performing memory initialization in a volatile memory of a computer system, in accordance with an embodiment of the present disclosure.

FIG. 3B illustrates a block diagram of the scrub engine 208 for performing the memory initialization on the DRAM 205 of the computer system 200. The DRAM 205 includes one or more main memory locations $304_1, 304_2 \ldots 304_N$. Each of the one or more main memory locations $304_1, 304_2 \ldots 304_N$ may be associated with a value (not shown in FIG. 3B) and an address. For example, the one or more main memory locations $304_1, 304_2 \ldots 304_N$ are associated with address 0x00, 0x01, ... 0xFF, respectively. The one or more main memory locations $304_1, 304_2 \ldots 304_N$ are referred to as the one or more main memory locations 304 hereafter in the present description. The value may be a binary value, a decimal value, a hexadecimal value, and the like. For example, the value may be "$1DF_{16}$".

In an embodiment, the write controller 302 is configured to determine a trigger for initialising the one or more main memory locations 304 in the DRAM 205 of the computer system 200. For example, the trigger may satisfy one or more conditions. For example, the write controller 302 may be configured to determine whether a triggering event has occurred. The trigger may include, but is not limited to, powering on of the computer system 200, identification of a request for initializing the one or more main memory locations 304, and the like. The request may be received from one or more applications in the computer system 200. In an embodiment, the request is received upon memory allocation by one more memory initialization functions. The memory initialization functions for allocation may be calloc, kzalloc, memset, malloc, and the like. In a first example, some main memory locations from the one or more main memory locations 304 are initialized when the computer system 200 is powered on. In a second example, the one or more applications provide a request to the CPU 201 to initialize some of the one or more main memory locations 304 when the one or more applications are running in the computer system 200 or begin running. Referring to FIG. 2, the CPU 201 may provide the trigger to the write controller 302 (not shown in FIG. 2) of the scrub engine 208. For example, the CPU 201 may provide a trigger signal to the write controller indicating that memory initialization is to be performed. In FIG. 2, the dotted lines show a flow of the memory initialization of the DRAM 205. As may be seen, a data bus 206 is not used to perform the memory initialization of the DRAM 205. Hence, the data bus 206 may be used to perform other operations when the memory initialization is being performed. In an embodiment, there is a first signal line directly connecting the CPU 201 to the memory controller 204 to enable memory initialization to be performed without using the data bus 206. In this embodiment, the signal line is not connected to the data bus 206, is not connected to a second signal connecting the cache 202 to the memory controller 204 and is not connected to a third signal line connecting the cache 202 to the TLB 203.

Further, the write controller 302 may be configured to initialise the one or more main memory locations 304 in the DRAM 205. The write controller 302 may initialise the one or more main memory locations 304 with pre-defined data related to the initialization, upon determining the trigger, the receiving the trigger, or receiving a signal indicating a triggering event has occurred. For example, the triggering event may be an initially powering on or receipt of a request to initialize some of the one or more main memory locations 304. The pre-defined data is one of, preset and stored in one or more registers associated with the computer system 200. Referring to the first example as stated above, the one or more main memory locations 304 may be initialized to value 0 when the computer system 200 is powered on. The value "0" may be preset for initialising the one or more main memory locations 304. Referring to the second example as stated above, the one or more main memory locations 304 may be initialized when the one or more applications are running in the computer system 200 or have started running. A run-time data to be initialised may be stored in the one or more registers. The write controller 302 may fetch the run-time data from the one or more registers, upon receiving the trigger. Further, the write controller 302 may initialise the one or more main memory locations 304 with the run-time data.

In an embodiment, the write controller 302 may be configured to write first data associated with a first location in the DRAM 205 to a second location in the DRAM 205. The write controller 302 may write the first data upon receiving a request for transferring (e.g., moving, migrating, etc.) the first data from the first location to the second location. The request may be received from one or more applications in the computer system 200. For example, consider the first location and the second location as X and Y, respectively. The first location X may be associated with a value 12. The first data is the value "12". A user running an application in the computer system may request copying of the first data from the first location X to the second location Y. The write controller 302 may write the value "12" in the second location Y.

Figure 4:
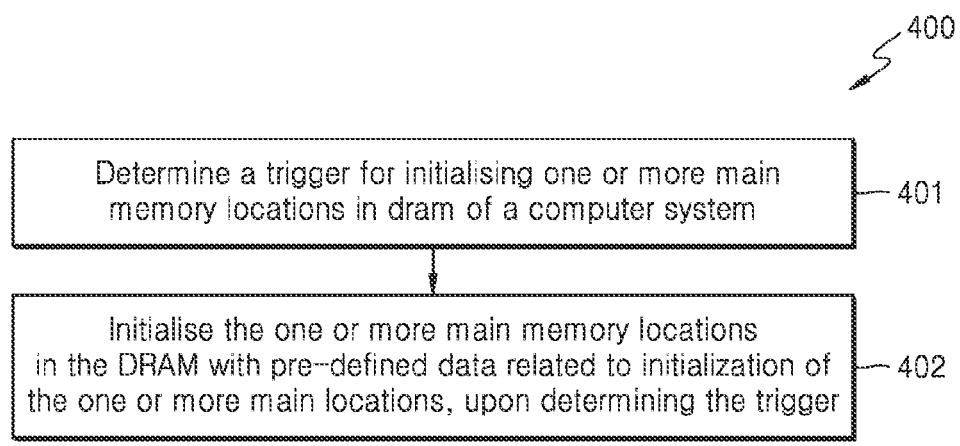
FIG. 4 shows an exemplary flow chart illustrating method steps performed using a write controller for initialising one or more main memory locations in a volatile memory, in accordance with an embodiment of the present disclosure.

FIG. 4 shows an exemplary flow chart illustrating method steps performed using the write controller 302 of the scrub engine 208, in accordance with an embodiment of the present disclosure. As illustrated in FIG. 4, the method 400 may include one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the write controller 302 determines the trigger for initialising the one or more main memory locations 304 in the DRAM 205 of the computer system 200. The trigger may be, but is not limited to, powering on of the computer system 200, identification of the request for initializing the one or more main memory locations 304, and the like. In an embodiment, the write controller 302 may determine the trigger based on a priority of performing the memory scrubbing and the memory initialization. The memory scrubbing may be performed upon detection of an idle time in a computer system 200, powering on of the computer system 200, and the like. For example, the idle time could occur when memory controller 204 is not performing an I/O operation based on a request from the CPU 201 or the memory controller 204 has not received a request from the CPU 201 after a certain period of time. Consider an instance, when the write controller 302 determines the trigger for performing the memory initialization and the memory scrubbing at a same time. For example, the write controller 302 may determine the trigger when a Basic Input/Output System (BIOS) is running in the computer system 200 or starts to run. The write controller 302 may perform the memory initialization at a priority since the trigger is received from the CPU 201. For example, even though a write operation is next to be performed, the write controller 302 could instead perform the memory initialization at a priority when the trigger is received. Thus, the write operation could be delayed until after the memory initialization has completed. The write controller 302 may perform the memory scrubbing upon performing the memory initialization. In another example, the write controller 302 may perform the memory scrubbing at the idle time in the computer system 200. An application from the one or more applications in the computer system 200 may request initializing the one or more main memory locations 304. The write controller 302 may perform the memory initialization. Upon performing the memory initialization, the write controller 302 may determine whether the idle time still exists. The write controller 302 may perform the memory scrubbing if the idle time still exists.

Figure 5:
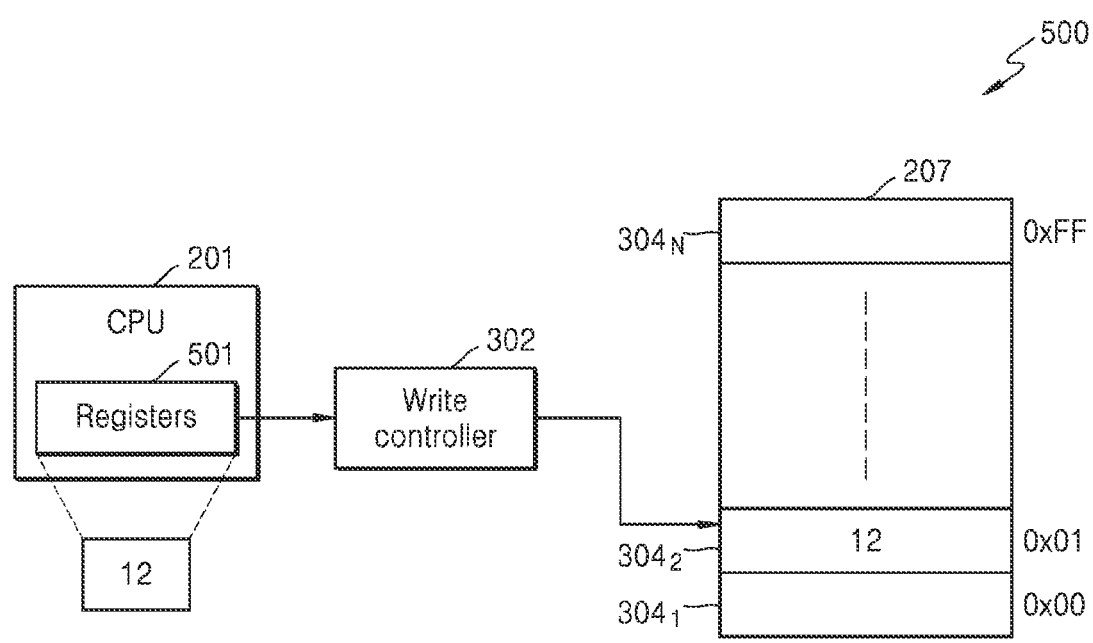
FIG. 5 shows an exemplary illustration for initialising one or more main memory locations in a volatile memory, in accordance with an embodiment of the present disclosure.

At step 402, the write controller 302 initialises the one or more main memory locations 304 in the DRAM 205, upon determining the trigger. The write controller 302 is configured to initialise the one or more main memory locations 304 with the pre-defined data related to the initialization. The pre-defined data is one of, preset and stored in the one or more registers associated with the computer system 200. Referring to example 500 of FIG. 5, consider the CPU 201 is associated with one or more registers 501. The one or more registers 501 are temporary memory units that store and transfer data and instructions that are being used immediately by the CPU 201. For example, the one or more registers 501 may be Multi-Purpose Register (MPR), Memory Data Register (MDR), Memory Buffer Register (MBR), and the like. A run-time data associated with an application from the one or more applications may be stored in the one or more registers 501. The run-time data may be a value "12". The write controller 302 may fetch the run-time data from the one or more registers 501. Further, the write controller 302 may initialise a main memory location $304_2$ amongst the one or more main memory locations 304 with the value "12".

In an embodiment, the write controller 302 is configured to initialise the one or more main memory locations 304 based on a status associated with each of the one or more main memory locations 304. The status indicates whether the initialization of a corresponding main memory location from the one or more main memory locations 304 is performed. In an embodiment, the status associated with each of the one or more main memory locations 304 is monitored by the scheduler 207. Table 1 below shows an example of the status associated with each of the one or more main memory locations 304.

TABLE 1

| Address of main memory location | Status |
|---|---|
| 0x00 | 0 |
| 0x04 | 1 |
| 0x06 | 1 |
| 0x08 | 0 |

The status associated with the one or more main memory locations 304 may be stored along with the address of the one or more main memory locations 304. The status of a main memory location may be "0" when the initialization of the main memory location is not performed. The status of a main memory location may be "1" when the initialization of the main memory location has been performed. The status may be stored in forms other than "0" and "1". The scheduler 207 may provide an indication (e.g., a signal) to the write controller 302 to initialise the one or more main memory locations 304, based on the status. For example, if the status of a given memory location indicates it has already been initialized, the write controller 302 can skip initializing of the given memory location. In an embodiment, the data of the Table 1 is stored in memory within the memory controller 204, memory within the scrub engine 208, memory within the write controller 302, or memory within the computer system 200 outside the memory controller 204.

Figure 6:
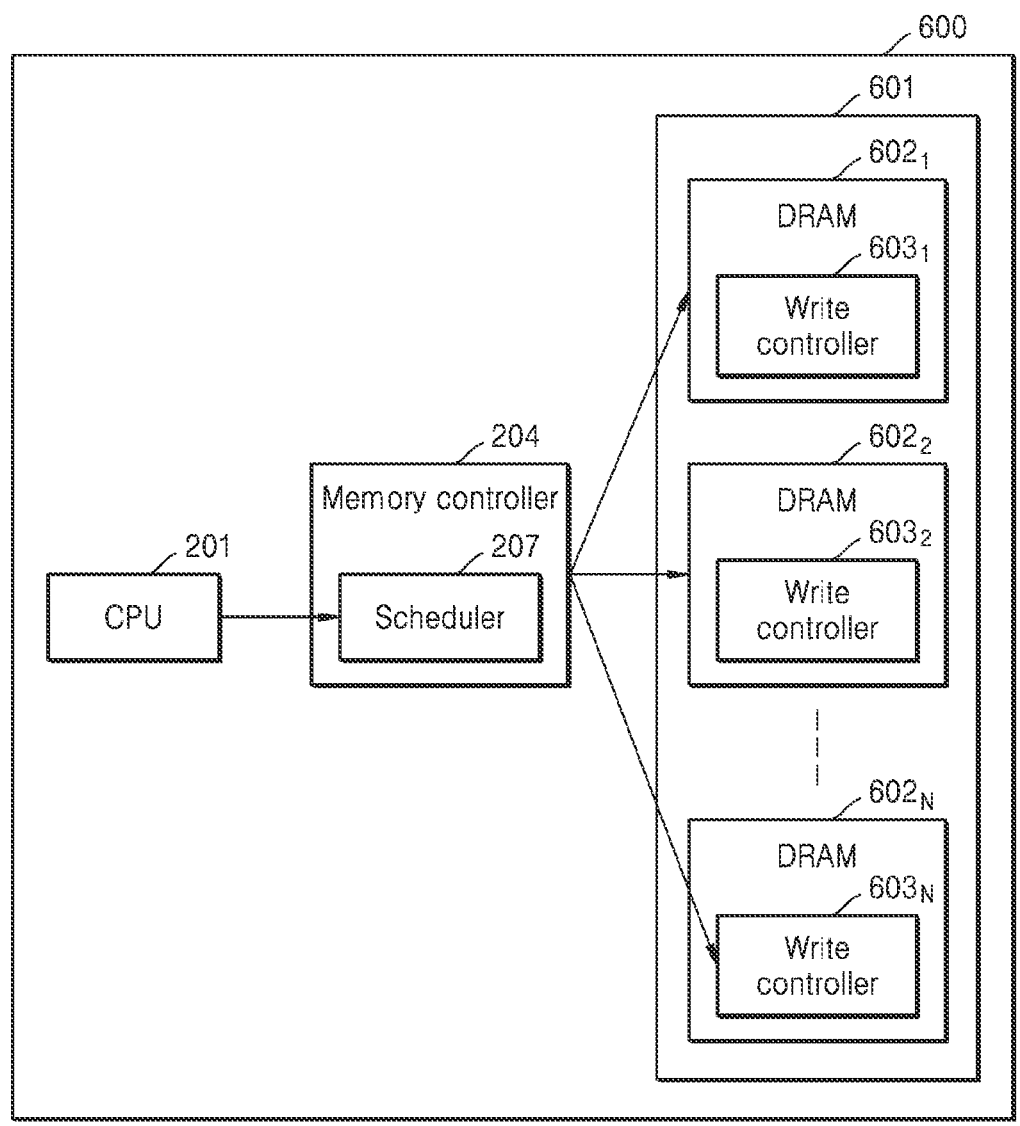
FIG. 6 illustrates an embodiment of the present disclosure for initialising one or more main memory locations in a volatile memory, in accordance with an embodiment of the present disclosure.

Reference is now made to FIG. 6 illustrating an embodiment 600 of the present disclosure. The computer system 200 includes a Dual In-line Memory Module (DIMM) 601. The DIMM 601 includes a plurality of DRAM circuits $602_1$, $602_2$, ... $602_N$. A plurality of scrub engines (not shown in FIG. 6) including a plurality of write controllers $603_1$, $603_2$, ... $603_N$ are implemented in the plurality of DRAM circuits $602_1$, $602_2$, ... $602_N$. Each of the plurality of DRAM circuits $602_1$, $602_2$, ... $602_N$ may be configured to perform the memory initialization of a corresponding DRAM circuit, in accordance with an embodiment of the present disclosure. Each of the plurality of DRAM circuits $602_1$, $602_2$, ... $602_N$ may include one or more memory banks. When a write controller among the plurality of write controllers $603_1$, $603_2$, ... $603_N$ is performing the memory initialization, the other write controllers may transfer data using the data bus 206. Each of the plurality of write controllers $603_1$, $603_2$, ... $603_N$ may be configured to perform the memory initialization of 'N' banks from among the one or more banks based on a priority of the one or more banks. The value of 'N' may depend on DRAM protocols such as Double Data Rate 4 (DDR4), Double Data Rate 5 (DDR5), and the like. For example, the value of 'N' may be 4 for DDR4. In an embodiment, the memory controller 204 may be associated with the plurality of DRAM circuits $602_1$, $602_2$, ... $602_N$. For example, the memory controller 204 may control the plurality of DRAM circuits $602_1$, $602_2$, ... $602_N$. In another embodiment, each of the plurality of DRAM circuits $602_1$, $602_2$, ... $602_N$ include an Integrated memory controller. For example, a first integrated memory controller of the DRAM circuit $602_1$ may initialize memory locations of memory banks of the DRAM circuit $602_1$, a second integrated memory controller of the DRAM circuit $602_2$ may initialize memory locations of memory banks of the DRAM circuit $602_2$.

At least one embodiment of the present disclosure provides a computer system including a write controller for performing the memory initialization. The computer system does not require a cache and a TLB, to perform the memory initialization. Thus, cache pollution and TLB pollution may avoided.

In an embodiment of the computer system, there is no requirement of the data bus (e.g., 206) to perform the memory initialization. Thus, the data bus 206 may be used to transfer data when the memory initialization is being performed. Further, usage of the CPU (e.g., 201) may be reduced, which may also reduce power consumption of the computer system.

When a single device or article is described above, it will be readily apparent that more than one device/article (whether or not they cooperate) may be used in place of a single device/article. Similarly, where more than one device or article is described above (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

What is claimed is:

1. A memory interface for interfacing with a memory device, the memory interface comprising:
   a control circuit configured to determine whether a trigger event has occurred for initializing one or more memory locations in the memory device, and initialize the one or more memory locations in the memory device with pre-defined data upon determining the trigger event has occurred,
   wherein the pre-defined data is run-time data from an application running on a computer system including the memory device,
   wherein the pre-defined data is stored in one or more registers associated with the computer system.

2. The memory interface of claim 1, further comprising a cache connected to the control circuit, and the control circuit performs the initialize without using the cache.

3. The memory interface of claim 2, further comprising a translation lookaside buffer (TLB) connected to the cache, and the control circuit performs the initialize without using the TLB.

4. The memory interface of claim 2, further comprising a central processing unit (CPU) connected to the cache via a data bus and connected to the control circuit via a signal line separate from the data bus, and the control circuit determines the trigger event has occurred in response to receiving a trigger signal from the CPU through the signal line.

5. The memory interface of claim 4, the control circuit performs the initialize without using the data bus.

6. The memory interface of claim 1, wherein the memory is a dynamic random-access memory (DRAM).

7. The memory interface of claim 1, wherein the control circuit is located within a scrub engine that is configured detect whether an error has occurred in original data in a given one of the memory locations, correct the original data into corrected data upon detecting the error, and write the corrected data to volatile memory.

8. The memory interface of claim 7, wherein the scrub engine detects whether the error has occurred upon detection of an idle time or a powering on a computer system including the volatile memory.

9. The memory interface of claim 1, wherein the trigger event indicates one of i) powering on of a computer system including a volatile memory and ii) identification of a request for initializing the one or more memory locations received from an application in the computer system.

10. The memory interface of claim 1, wherein the control circuit is configured to initialise the one or more memory locations based on a status associated with each of the one or more memory locations, wherein the status indicates whether the initialization of a corresponding memory location among the one or more memory locations has already been performed.

11. The memory interface of claim 1, wherein the control circuit is further configured to write first data associated with a first location in the memory device to a second location in the memory device, upon receiving a request for transferring the first data from the first location to the second location from an application in a computer system including the memory device.

12. A method for interfacing with a memory device, the method comprising:
   determining, by a control circuit of a memory interface, whether a trigger event has occurred for initializing one or more memory locations in the memory device; and
   initializing, by the control circuit, the one or more memory locations in the memory device with pre-defined data related upon determining the trigger event has occurred,
   wherein the pre-defined data is run-time data from an application running on a computer system including the memory device,
   wherein the pre-defined data is stored in one or more registers associated with the computer system.

13. The method of claim 12, wherein the initializing is performed without using a cache connected to the control circuit.

14. The method of claim 13, wherein the initializing is performed without using a translation lookaside buffer (TLB) connected to the cache.

15. The method of claim 13, wherein the determining comprises the control circuit determining the trigger event has occurred in response to receiving a trigger signal through a signal line from a central processing unit (CPU) connected to the cache that is separate from a data bus connecting the CPU to the cache.

16. The method of claim 15, wherein the initializing is performed without using the data bus.

17. The method of claim 12, wherein the trigger event indicates identification of a request for initializing the one or more memory locations received from an application in the computer system.

18. A memory interface for interfacing with a memory device, the memory interface comprising:
    a memory controller connected to the memory device;
    a cache connected to the memory controller; and
    a central processing unit (CPU) connected to the cache via a data bus and connected to the memory controller via signal line separate from the data bus,
    wherein the memory controller initializes one or more memory locations of the memory device in response to receiving a trigger signal from the CPU via the signal line.

19. The memory interface of claim 18, wherein the memory controller comprises a scrub engine to perform a scrub operation on the memory device, and the scrub engine performs the initializing of the one more memory locations.

* * * * *